Patented Dec. 30, 1941

2,267,779

UNITED STATES PATENT OFFICE 2,267,779

STABILIZED VINYL RESIN

Victor Yngve, Lakewood, Ohio, assignor to Carbide and Carbon Chemicals Corporation, a corporation of New York No Drawing. Application September 17, 1940, Serial No. 357,096

7 Claims. (Cl. 260—86)

The invention relates to stabilized vinyl resins and compositions containing the same. It is particularly concerned with new and improved stabilizing materials which show definite advantages in preventing deterioration of vinyl resins at elevated temperatures.

As synthetic resinous bodies vinyl resins are well known in the art, and their valuable properties as components of plastic compositions of various sorts have been recognized. In the compounding and processing of such resins into molded and extruded articles, or as constituents of certain coating compositions it is usually necessary to subject the plastics to certain degrees of heat. Under such conditions, as well as at elevated temperatures which may be encountered in normal usage, a tendency toward deterioration is quite commonly encountered. To prevent decomposition in this respect it has, therefore, been considered essential with known types of vinyl resin to incorporate therewith additive materials adapted to exert a stabilizing action, and numerous compounds have been suggested for this purpose.

The present invention is particularly concerned with vinyl resins of the type which may be formed by conjoint polymerization of a vinyl halide with the vinyl ester of an aliphatic acid, such as are described in U. S. Patent No. 1,935,577 to E. W. Reid. Within the broader class of these resins, conjointly polymerized vinyl chloride and vinyl acetate containing in the polymer 60% to 95% of vinyl chloride, or other halide, are especially susceptible to stabilization by the compounds hereinafter described.

In accordance with my invention I have found that alkyl derivatives of tin will function as excellent stabilizers for vinyl resins, and when intimately dispersed therein will provide plastic compositions of substantially improved resistance to heat deterioration. A particular advantage in these compounds, other than in their actual stabilizing function, also resides in the fact that resin compositions incorporating them show practically no tendency toward discoloration in the presence of hydrogen sulfide, thereby presenting an especially valuable application of the materials in vinyl resin plastics which may be contacted with sulfur compounds.

Among the alkyl tin derivatives, those containing in the alkyl radical three or more carbon atoms are preferable. Typical of these are the tin organo-metallic compounds containing the propyl, isopropyl, butyl, isobutyl, tertiary butyl, the various amyl, hexyl, octyl groups and the like. A mixed alkyl grouping in the tin compound is also appropriate, which may include two or more different alkyl radicals in the molecule. Representative of specific compounds within the broader classification are those of the following formulae:

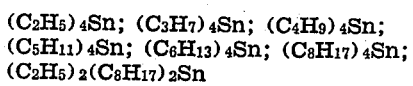

$(C_2H_5)_4Sn$; $(C_3H_7)_4Sn$; $(C_4H_9)_4Sn$;
$(C_5H_{11})_4Sn$; $(C_6H_{13})_4Sn$; $(C_8H_{17})_4Sn$;
$(C_2H_5)_2(C_8H_{17})_2Sn$

Throughout this specification, and the claims, the broadest scope of the invention as defined by the class organo-metallic alkyl derivatives of tin is intended to include any or all of the compounds as above represented.

As an example of the effectiveness of these new stabilizers a small quantity of tetrabutyl tin was incorporated in a vinyl resin plastic composition. The resin employed was one formed by the conjoint polymerization of vinyl chloride and vinyl acetate and containing about 87% of vinyl chloride. The tetrabutyl tin was intimately and thoroughly dispersed in the resinous mass by milling on a heated two-roll mill. In subsequent processing at elevated temperatures the plastic did not darken. In practice 1 to 3% of tetrabutyl tin is preferred for incorporation in the resin.

Further experiments with vinyl resin compositions similar to the above were made, including as the stabilizer, others of the organo-metallic alkyl derivatives of tin set forth above. The results obtained showed improved heat stability in all instances over plastic compositions of similar vinyl resin containing known stabilizing materials.

To incorporate the stabilizer within the resin composition methods heretofore known may be employed which will effect an intimate dispersion thereof throughout the resin mass. The amounts necessary to effect desirable heat stability are also within a range heretofore found suitable with other materials, varying from about 0.5% to about 3.0% by weight of the vinyl resin. In the compounding of plastic compositions for various uses, there may be included any of the common solvents, plasticizers, pigments, and other modifying materials without detrimental effect upon the heat stability afforded by these new stabilizers.

Modifications within the scope of the appended claims will be evident and are intended to be included within the invention as defined therein.

This application is in part a division of my application Serial Number 118,568, filed December 31, 1936, now Patent No. 2,219,463.

I claim:

1. A heat-stable resinous composition comprising a vinyl resin containing polymerized vinyl halide and a stabilizing material, said stabilizing material comprising an organo-metallic tetra-alkyl derivative of tin.

2. A heat-stable resinous composition comprising a vinyl resin containing polymerized vinyl halide and a stabilizing material, said stabilizing material comprising an organo-metallic tetra-alkyl derivative of tin in which the alkyl radicals contain at least three carbon atoms.

3. A heat-stable resinous composition comprising a vinyl resin containing polymerized vinyl halide and a stabilizing material, said stabilizing material comprising an organo-metallic mixed tetra-alkyl derivative of tin.

4. A heat-stable resinous composition comprising a vinyl resin of the type formed by the conjoint polymerization of a vinyl halide with a vinyl ester of an aliphatic acid and containing in the polymer about 60% to 95% of the vinyl halide, and a stabilizing material intimately dispersed therein, said stabilizing material comprising an organo-metallic tetra-alkyl derivative of tin.

5. A heat-stable resinous composition comprising a vinyl resin of the type formed by the conjoint polymerization of vinyl chloride with vinyl acetate and containing in the polymer about 60% to 95% of vinyl chloride, and a stabilizing material intimately dispersed therein, said stabilizing material comprising tetrabutyl tin.

6. A heat-stable resinous composition comprising a vinyl resin of the type formed by the conjoint polymerization of vinyl chloride with vinyl acetate and containing in the polymer about 60% to 95% of vinyl chloride, and a stabilizing material intimately dispersed therein, said stabilizing material comprising tetraethyl tin.

7. Process of producing heat-stable resinous compositions which comprises intimately mixing a vinyl resin of the type formed by conjoint polymerization of vinyl chloride with vinyl acetate and containing about 60% to 95% vinyl chloride in the polymer with about 0.5% to about 3% of a stabilizing material, said stabilizing material comprising an organo-metallic tetra-alkyl derivative of tin.

VICTOR YNGVE.